(12) United States Patent
Luo et al.

(10) Patent No.: US 8,790,527 B1
(45) Date of Patent: Jul. 29, 2014

(54) METHOD AND SYSTEM FOR MANUFACTURING TAPERED WAVEGUIDE STRUCTURES IN AN ENERGY ASSISTED MAGNETIC RECORDING HEAD

(75) Inventors: Guanghong Luo, Fremont, CA (US); Ming Jiang, San Jose, CA (US); Danning Yang, Fremont, CA (US); Yunfei Li, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 272 days.

(21) Appl. No.: 13/069,023

(22) Filed: Mar. 22, 2011

(51) Int. Cl.
*H01L 21/302* (2006.01)
*H01L 21/461* (2006.01)
*B29D 11/00* (2006.01)
*C03C 15/00* (2006.01)
*C03C 25/68* (2006.01)

(52) U.S. Cl.
USPC ............. 216/24; 438/689; 438/690; 438/691; 438/692; 438/693; 216/52; 216/53; 216/83; 216/88; 216/89

(58) Field of Classification Search
None
See application file for complete search history.

(56) References Cited

U.S. PATENT DOCUMENTS

| 7,427,526 | B2 | 9/2008 | Fonash et al. |
| 7,757,380 | B2 | 7/2010 | Baer et al. |
| 2007/0026537 | A1* | 2/2007 | Jiang et al. ............... 438/3 |
| 2007/0183093 | A1* | 8/2007 | Le et al. ............... 360/126 |
| 2010/0024201 | A1 | 2/2010 | Le et al. |

* cited by examiner

*Primary Examiner* — Nadine Norton
*Assistant Examiner* — Stephanie Duclair (57) ABSTRACT

A method for providing waveguide structures for an energy assisted magnetic recording (EAMR) transducer is described. The waveguide structures have a plurality of widths. At least one waveguide layer is provided. Mask structure(s) corresponding to the waveguide structures and having a pattern are provided on the waveguide layer(s). The mask structure(s) include a planarization stop layer, a planarization assist layer on the planarization stop layer, and a hard mask layer on the planarization assist layer. The planarization assist layer has a low density. The pattern of the mask structure(s) is transferred to the waveguide layer(s). Optical material(s) that cover the waveguide layer(s) and a remaining portion of the mask structure(s) are provided. The optical material(s) have a density that is at least twice the low density of the planarization assist layer. The method also includes performing a planarization configured to remove at least a portion of the optical material(s).

12 Claims, 12 Drawing Sheets

METHOD AND SYSTEM FOR MANUFACTURING TAPERED WAVEGUIDE STRUCTURES IN AN ENERGY ASSISTED MAGNETIC RECORDING HEAD

BACKGROUND

Figure 1:
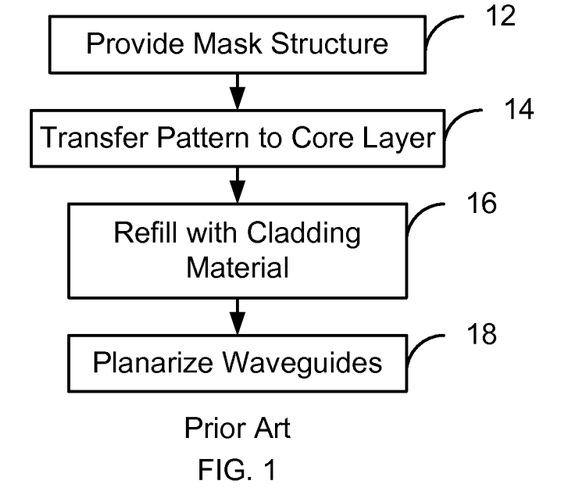
FIG. 1 is a flow chart depicting a conventional method of forming waveguide structures.

FIG. 1 depicts a conventional method 10 for fabricating a waveguide in a conventional energy assisted magnetic recording (EAMR) head. The conventional method 10 typically commences after a layer of optical material, such as $Ta_2O_5$, has been deposited for the waveguide core. A conventional mask structure is provided for the waveguide, via step 12. Step 12 typically includes providing a multilayer mask consisting of a planarization stop layer and a hard mask layer. This mask is provided by depositing these hard mask layers, using photolithography to form a photoresist mask having the desired pattern for the waveguide, then transferring the photoresist pattern to the hard mask. The pattern in the hard mask is then transferred to the core material, via step 14. The region around the core is refilled, via step 16. The refill typically includes depositing a dielectric, such as aluminum oxide, that is used for the cladding. The transducer is then planarized, via step 18. For example, a chemical mechanical planarization (CMP) may be used. The stop layer of the hard mask is typically a stop layer for the CMP. The CMP thus removes the portion of the cladding material above the core layer.

Figure 2:
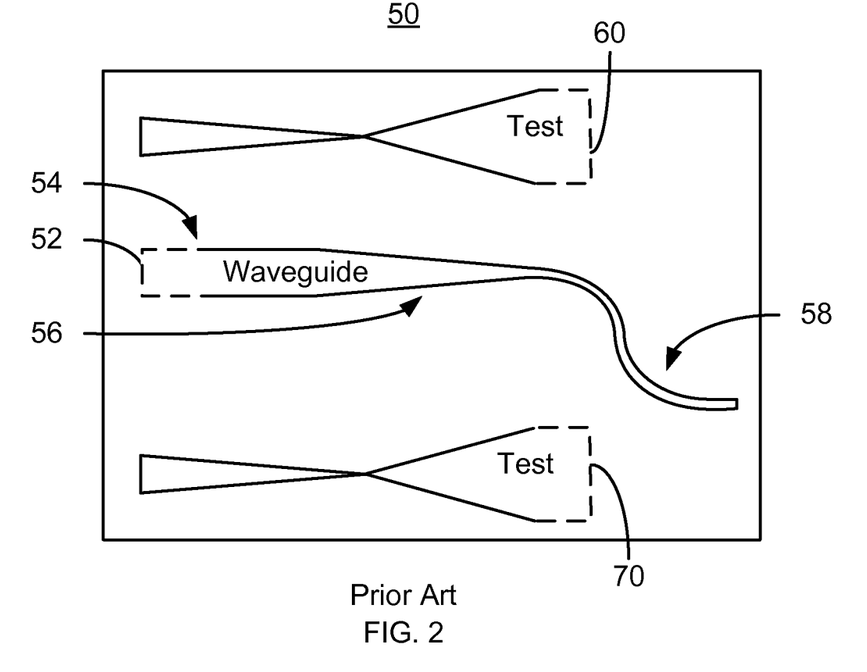
FIG. 2 depicts a waveguides structures in a conventional EAMR head.
Figure 3:
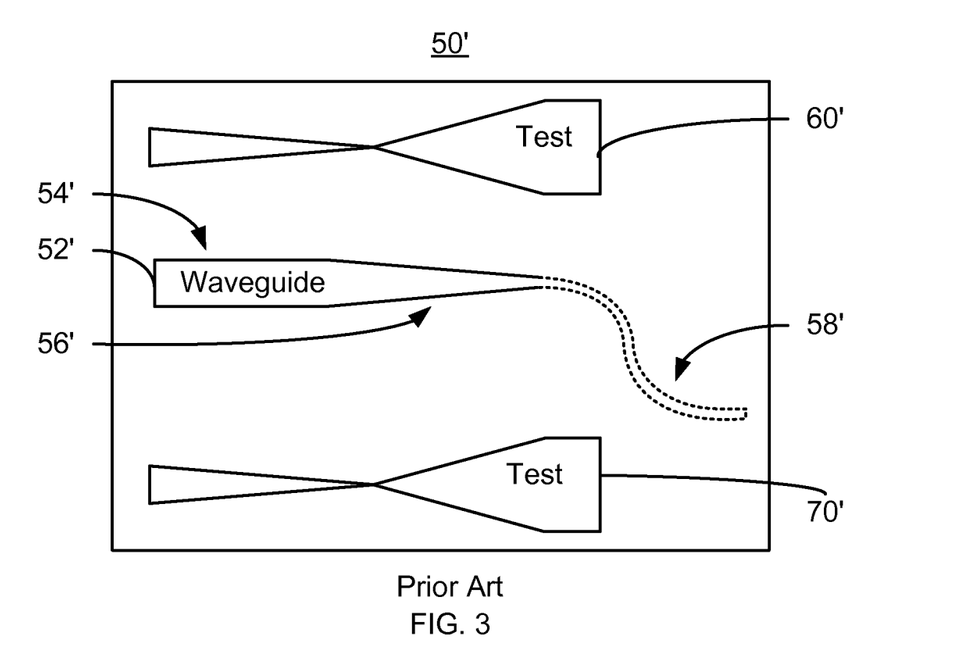
FIG. 3 depicts a waveguides structures in a conventional EAMR head.

Although the conventional method 10 functions, performance and manufacturability of the conventional EAMR head may suffer. For example, FIGS. 2-3 depict conventional EAMR transducers 50 and 50', respectively, after fabrication using the method 10. For simplicity, FIGS. 2-3 are not to scale and not all components are shown. The conventional transducer 50 includes waveguide 52 and test structures 60 and 70. The waveguide 52 is a tapered waveguide including a wider end portion 54, tapered region 56 and narrow region 58. The wider end portion 54 may be on the order of 5 microns, while the narrow portion 58 may be on the order of 0.5 micron. The text structures 60 and 70 are used in testing the performance of the EAMR transducer 50. The widest portions of the test structures 60 and 70 may be even wider than the waveguide 52. For example, the test structures 60 and 70 may be up to seventy microns in width. The EAMR transducer 50' depicted in FIG. 3 is analogous to that depicted in FIG. 2. Similar components have analogous labels. Thus, the EAMR transducer 50' includes waveguide 52' having portions 54', 56', and 58' as well as test structures 60' and 70 corresponding to waveguide 52 having portions 54, 56, and 58 as well as test structures 60 and 70, respectively.

For the EAMR transducer 50 depicted in FIG. 2, the planarization step 18 of the method 10 is carried out until the narrow portion 58 of the waveguide 52 is exposed. As a result, wider portions of the waveguide 52 and test structures 60 and 70 may not be exposed. Instead, such portions of the waveguide 52 and test structures 60 and 70 may remain covered in the cladding material deposited in step 16. Such covered portions of the waveguide 50 and test structures 60 and 70 are denoted by the dashed lines in FIG. 2. In contrast, for the EAMR transducer 50' of FIG. 3, the planarization step 18 is carried out until the wider portions of the waveguide 52' and test structures 60' and 70' are exposed in step 18. However, this may result in overpolishing of the narrow portion 58' of the waveguide 52'. Thus, the core materials for the waveguide 52' may be partially or completely removed. In either case, fabrication and performance of the conventional EAMR transducers 50 and 50' are adversely affected.

Accordingly, what is needed is a system and method for improving manufacturability and performance of an EAMR head.

BRIEF SUMMARY OF THE INVENTION

A method for providing waveguide structures for an energy assisted magnetic recording (EAMR) transducer is described. The waveguide structures have a plurality of widths. At least one waveguide layer is provided. Mask structure(s) corresponding to the waveguide structures and having a pattern are provided on the waveguide layer(s). The mask structure(s) include a planarization stop layer, a planarization assist layer on the planarization stop layer, and a hard mask layer on the planarization assist layer. The planarization assist layer has a low density. The pattern of the mask structure(s) is transferred to the waveguide layer(s). Optical material(s) that cover the waveguide layer(s) and a remaining portion of the mask structure(s) are provided. The optical material(s) have a density. The low density of the planarization assist layer is not more than half of the density of the optical material(s). The method also includes performing a planarization configured to remove at least a portion of the optical material(s).

DETAILED DESCRIPTION OF THE EMBODIMENTS OF THE INVENTION

Figure 4:
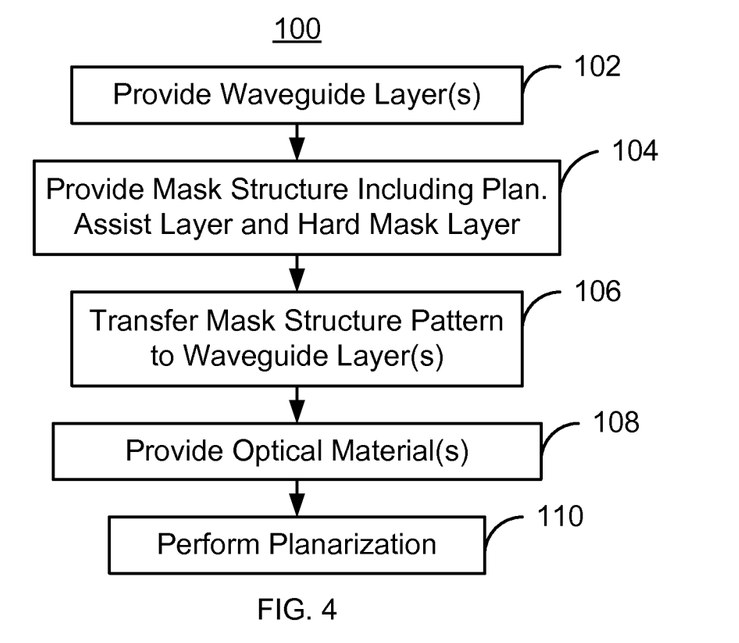
FIG. 4 is a flow chart depicting an exemplary embodiment of a method for forming waveguide structures in an EAMR head.

FIG. 4 is an exemplary embodiment of a method 100 for providing waveguide structures in an EAMR transducer. For simplicity, some steps may be omitted, interleaved, or combined. The method 100 is also described in the context of providing a single EAMR transducer. However, the method 100 may be used to fabricate multiple transducers at substantially the same time. The method 100 is also described in the context of particular layers. A particular layer may include multiple materials and/or multiple sub-layers. The method 100 also may start after formation of other portions of the magnetic recording transducer. For example, the method 100 may commence after deposition of cladding, portion(s) of a pole and/or coil. The waveguide structures may include the waveguide used to direct energy from the laser (not shown) and test structures.

Waveguide layer(s) that are to be patterned are provided, via step 102. Step 102 may include depositing the optical material(s) used in the core, such as $Ta_2O_5$. Thus, in some embodiments, a single layer of material is provided. In other embodiments, multiple layers may be provided.

At least one mask structure is provided on the waveguide layer(s), via step 104. The mask structure has a pattern corresponding to the waveguide structures to be fabricated. The layers of the mask structure(s) include a planarization stop layer, a planarization assist, and a hard mask layer. The planarization assist layer is on the planarization stop layer. The hard mask layer is on the planarization assist layer. The planarization stop layer might include materials such as SiC, diamond-like carbon (DLC), and/or amorphous carbon (a-C). The planarization assist layer has a low density with respect to subsequent optical materials, described below. The planarization assist layer may include photoresist and/or polydimethylglutarimide (PMGI). The hard mask layer may include materials such as Cr. Forming the mask structure(s) in step 104 may include depositing the mask layers, providing a photoresist mask on the hard mask layer, and then transferring the photoresist mask pattern to the layers of the mask structure. This pattern transfer may include performing one or more reactive ion etches (RIEs) appropriate for the layers of the mask structure.

The pattern of the mask structure(s) is transferred to the waveguide layer(s), via step 106. Step 106 may be performed using the appropriate removal process for the waveguide layer(s). For example, a $Ta_2O_5$ RIE might be used. Thus, the core layer of the waveguide structure(s) may be formed.

Optical material(s) covering the waveguide layer(s) and a remaining portion of the at least one mask structure are provided, via step 108. The optical material(s) may include aluminum oxide and/or silicon dioxide. These material(s) may be used for the cladding. Thus, the optical material(s) deposited in step 108 may have a lower index of refraction than the optical material(s) provided in step 102. In some embodiments, the optical material(s) are blanket deposited in step 108. A deposition technique such as a fast atomic layer deposition (ALD) may be used. Further, the low density of the planarization assist layer is not more than half of the density of the optical material(s), via step 108. In some embodiments, the low density of the planarization assist layer is not more than one-third of the density of the optical material(s).

A planarization configured to remove the optical material(s) is performed, via step 110. Step 110 may include forming an additional planarization stop layer having aperture(s) corresponding to the waveguide structure(s) prior to the planarization step. The planarization may be a CMP that is to remove the aluminum oxide or silicon dioxide deposited in step 108. Because the planarization assist layer has a lower density than these optical material(s), the planarization in step 110 tends to break up the planarization assist layer. The planarization assist layer may thus be viewed as being at least partially crushed in step 110. In other words, the planarization of step 110 may lift off the planarization assist layer as well as any layers on the planarization assist layer. The planarization assist layer may thus be removed much more quickly and efficiently. In addition to removing the optical material(s), the hard mask structure may be more easily removed using the planarization of step 110.

Once the planarization is complete, any remaining portions of the planarization stop layers may be removed. Fabrication of the EAMR transducer may then be completed. For example, the top cladding layer may be deposited to complete the waveguide structure(s). Other components may also be formed.

Figure 5:
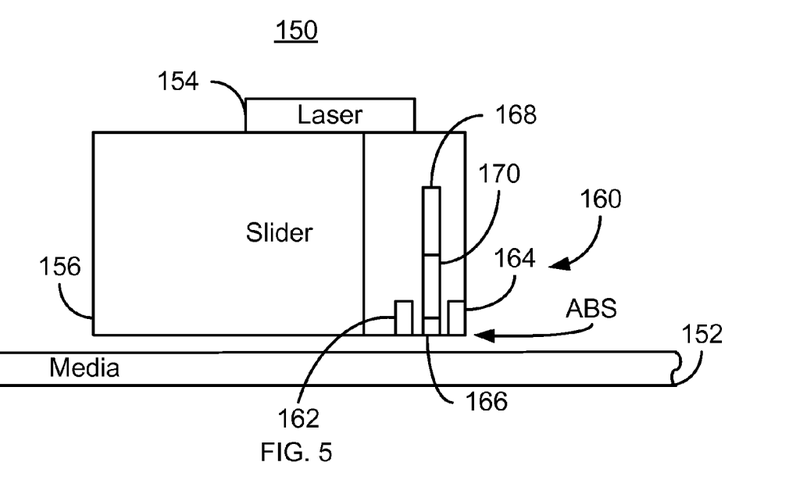
FIG. 5 depicts an exemplary embodiment of an EAMR disk drive.
Figure 6:
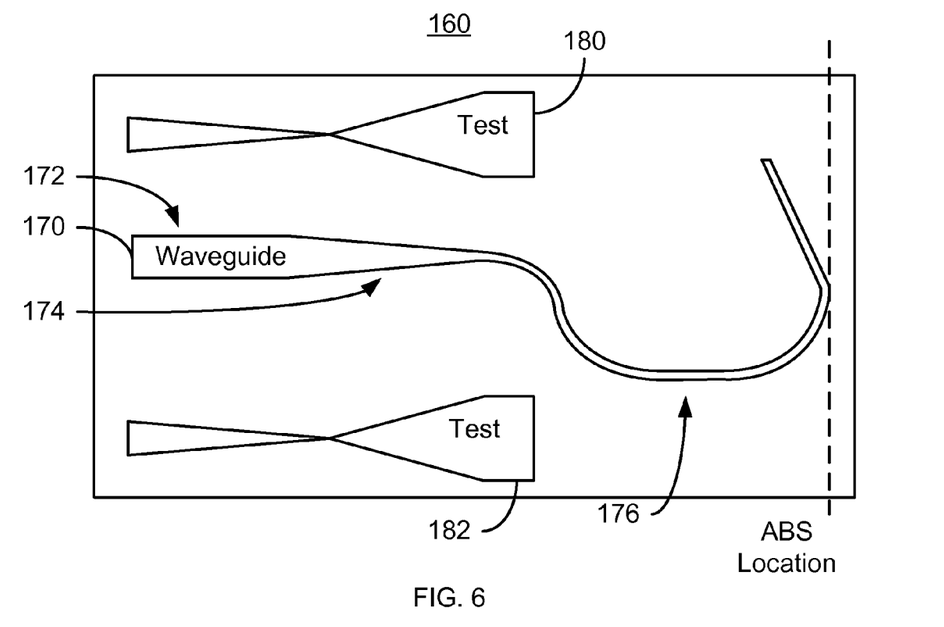
FIG. 6 depicts an exemplary embodiment of waveguide structures in a portion of an EAMR head.

FIGS. 5-6 are diagrams depicting a portion of an EAMR disk drive 150 and EAMR transducer 160, a portion of which may be fabricated using the method 100. For clarity, FIGS. 5-6 are not to scale. FIG. 6 depicts a plan view of waveguide structures used in fabricating the EAMR transducer 160. For simplicity not all portions of the EAMR disk drive 150 are shown. In addition, although the disk drive 150 is depicted in the context of particular components other and/or different components may be used. In addition, although single components, such as lasers, are shown, multiple components may be used in other embodiments. Further, the arrangement of components may vary in different embodiments.

The EAMR disk drive 150 includes media 152, laser 154, a slider 156, and an EAMR transducer 160 that is optically coupled with the laser 154. In some embodiments, the laser 154 is a laser diode. Although shown as coupled with the back edge of the slider 156, the laser may be located elsewhere. For example, the laser 154 may be coupled to the trailing face of the slider 156, in proximity to the EAMR transducer 160.

The EAMR transducer 160 is coupled with the slider 156. The EAMR transducer 160 includes a pole 162, coil(s) 164, optional near-field transducer (NFT) 166, input coupler 168, and waveguide 170. In one embodiment, the EAMR transducer 160 is optically coupled to the laser 154 through the input coupler 168, which may be a grating. However, in other embodiments, the grating 168 may be omitted. The waveguide 170 is configured to direct energy from the laser 154 toward the ABS and is formed using the method 100. The NFT 166 is proximate to the ABS and optically coupled to the waveguide 170. Thus, in embodiments in which the NFT 166 is present, the waveguide 170 directs energy toward the NFT 166. The NFT 166 may be used to couple energy from the waveguide 170 to the media 152. Although described as coupled to the slider 156, the EAMR transducer 160 may be considered to be fabricated as part of the slider 156. In operation, energy, typically in the form of light in the optical range of the spectrum, is emitted from the laser 154. The energy is coupled into the transducer 160 via input coupler/grating 168. The waveguide 170 directs the energy toward the NFT 166. The NFT 166 couples energy to the media 152. The coils 164 energize the pole 162, which magnetically writes to the heated region of the media.

FIG. 6 depicts a plan view of the waveguide structures 170, 180, and 182. In particular, test structures 180 and 182 are shown. In addition, the waveguide 170 shown is a tapered waveguide. Thus, the waveguide 170 includes a wider region 172, a tapered portion 174, and a narrow portion 176. As can be seen in FIG. 6, the waveguide structures 170, 180, and 182 have varying widths. Further, in some embodiments, there is significant variation in the widths between the structures 170, 180, and 182. For example, the narrow portion 176 may be only 0.4 micron wide, while the wider portion 172 may be on the order of four micron. The test structures 180 and 182 may be even wider, for example on the order of seventy microns.

Because the waveguide structures 170, 180, and 182 of the EAMR transducer 160 are formed using the method 100, fabrication of the EAMR transducer 160 may be improved. The presence of the planarization assist layer allows portions of the mask structures (not shown in FIGS. 5-6) used in forming the waveguide structures 170, 180, and 182 to be more easily removed. Stated differently, the mask structure(s) above both the test structures 180 and 182 as well as the mask structure(s) above the waveguide 170 may be removed together. The narrow portion 176 of the waveguide 170, the wider portion 172 of the waveguide, and the test structures 180 and 182 may all be exposed by the planarization of step 110 without overpolishing/removing the narrow portion 176 of the waveguide 170. Consequently, the waveguide 170 and test structures 180 and 182 may function as desired. Thus, fabrication and performance of the transducer 160 may be improved.

Figure 7:
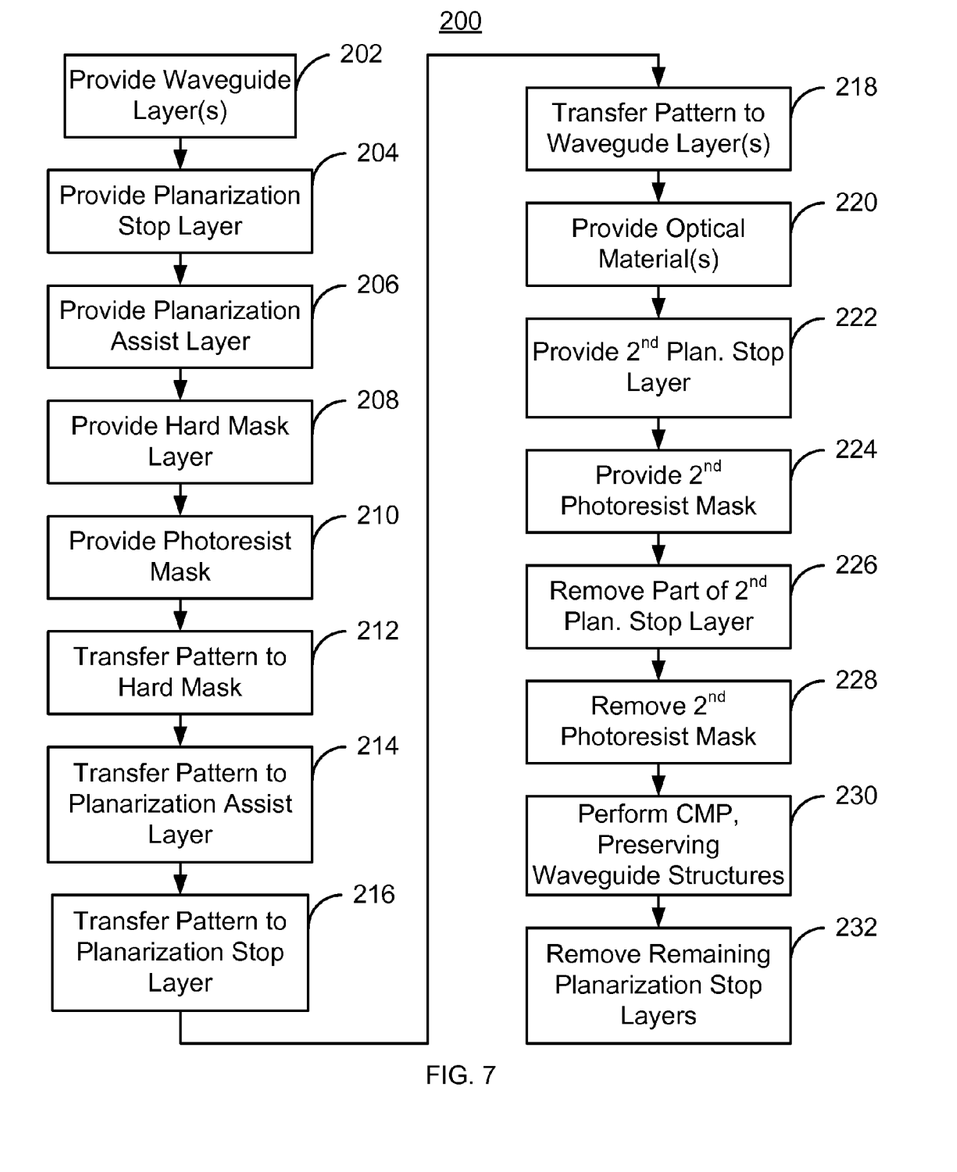
FIG. 7 is a flowchart depicting another exemplary embodiment of a method of forming waveguide structures in an EAMR head.

FIG. 7 is a flow chart depicting another exemplary embodiment of a method 200 for fabricating waveguide structures in an EAMR transducer. FIGS. 8-18 depict ABS and backside views of another exemplary embodiment of an EAMR transducer 250 during fabrication. In some drawings, plan views are also shown. For clarity, FIGS. 8-18 are not to scale. The method 200 is described in the context of the transducer 250. For simplicity, some steps of the method 200 may be omitted, combined, or interleaved. The method 200 is also described in the context of providing a single recording transducer 250. However, the method 200 may be used to fabricate multiple transducers at substantially the same time. The method 200 and transducer 250 are also described in the context of particular layers. A particular layer may include multiple materials and/or multiple sub-layers. The method 200 also may start after formation of other portions of the magnetic recording transducer 250.

Waveguide layer(s), including a core layer, are provided, via step 202. More specifically, a higher index of refraction material such as $Ta_2O_5$ may be provided.

A planarization stop layer is deposited, via step 204. For example, a SiC, DLC and/or a-C may be deposited. A planarization assist layer is also deposited on the planarization stop layer, via step 206. Step 206 may include spin coating a layer of PMGI and/or photoresist. This layer may be quite thick, for example on the order of one to three microns or more. The planarization assist layer is desired to have a low density and capable of breaking up during a CMP, as described below. A hard mask layer, such as Cr, is also deposited on the planarization assist layer, via step 208.

Figure 8:
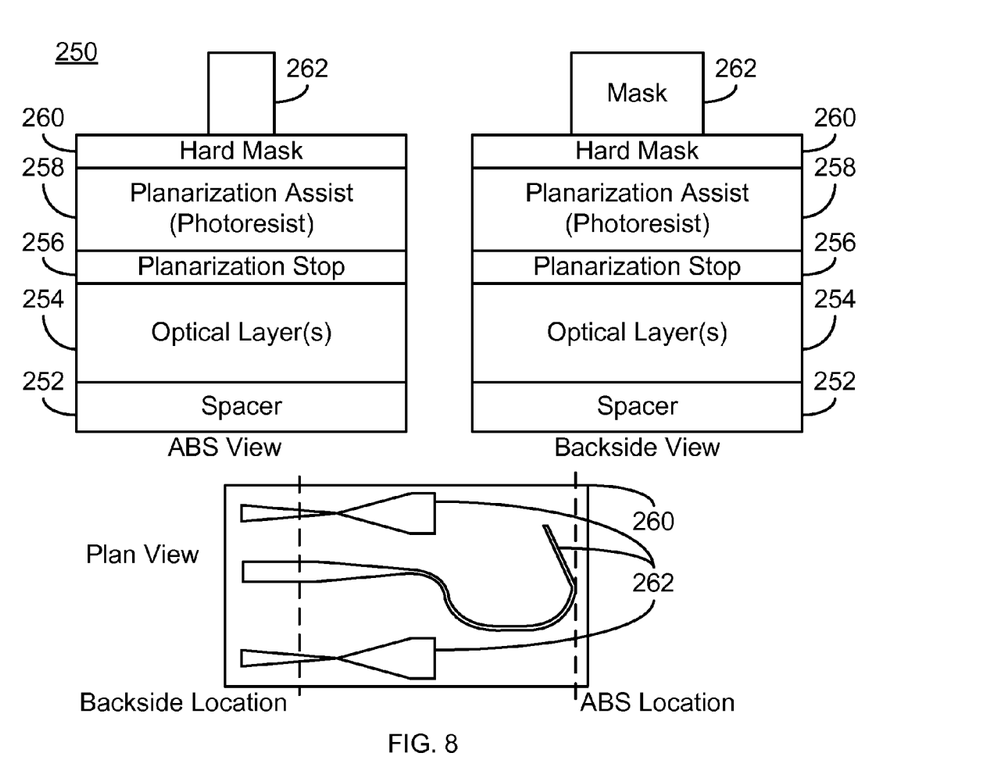
FIGS. 8-18 depict another exemplary embodiment of waveguide structures in an EAMR head.

A first photoresist mask is provided on the hard mask layer, via step 210. The first photoresist mask has a pattern corresponding to the plurality of waveguide structures. Step 210 may be performed by spin coating a layer of photoresist on the hard mask layer, then transferring the pattern to the photoresist layer using conventional photolithography. FIG. 8 depicts backside, ABS, and plan views of the transducer 250 after step 210 is performed. The plan view indicates the variation in width of the waveguide structures as well as the locations at which the ABS and backside views are taken. The optical layer(s) 254 are shown as residing on a spacer layer 252. In some embodiments, the spacer layer 252 is a bottom cladding layer. Planarization stop layer 256, planarization assist layer 258, and hard mask layer 260 are also shown. Mask 262 is also depicted. The ABS view may be considered to correspond to the narrow portion of a tapered waveguide, while the backside view corresponds to a wider portion of the waveguide. Although the widths of the mask 262 are shown as similar in FIG. 8, in practice, the widths may vary widely. For example, the width at the backside view may be a factor of ten or more multiplied by the width at the ABS view.

Figure 9:
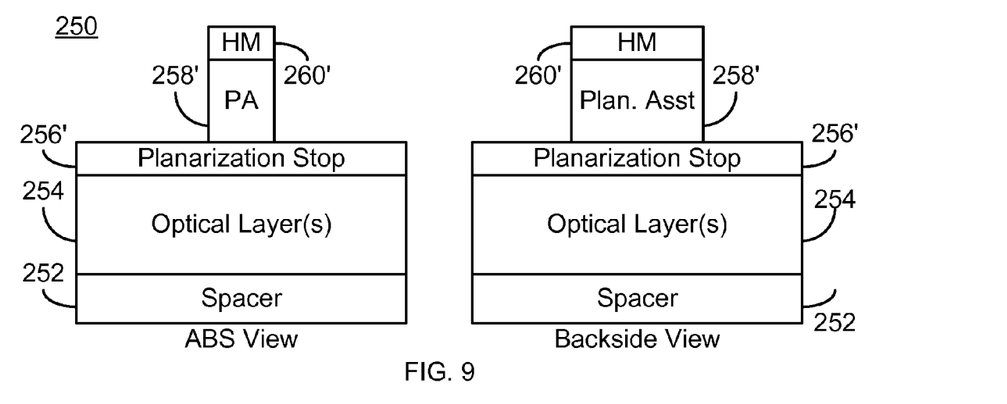

The pattern of the photoresist mask 262 is transferred to the hard mask layer 260, via step 212. Step 212 may include performing a Cr RIE. The pattern is also transferred to the planarization assist layer 258, via step 214. Step 214 may be performed using an RIE or other process appropriate for PMGI or photoresist. FIG. 9 depicts the transducer 250 after step 214 is performed. Thus, the pattern of the photoresist mask 262 has been transferred to the hard mask and planarization assist layers, forming hard mask structure 260' and planarization assist structure 258'. In the embodiment shown, the photoresist mask 262 has been consumed and thus is not depicted. However, in other embodiments, portions of the photoresist mask might remain. In addition, a small portion of the planarization stop layer 256 may be removed, leaving planarization stop layer 256'.

Figure 10:
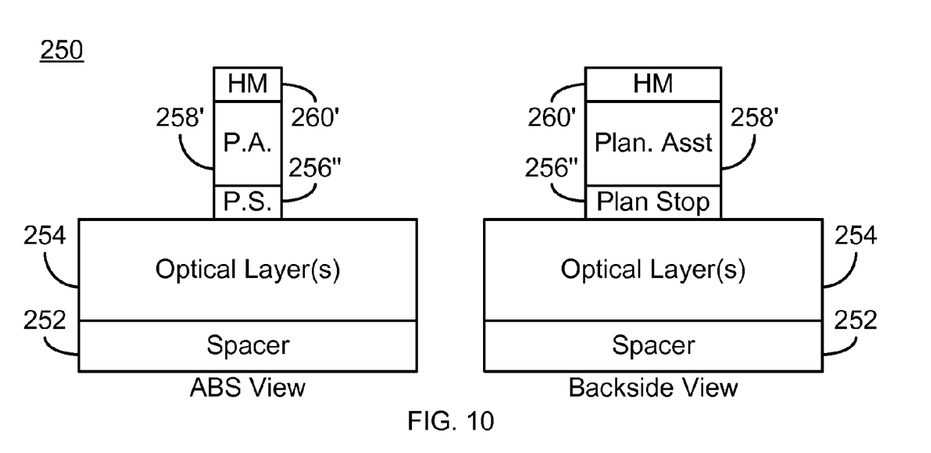

An RIE is also performed to transfer the mask pattern to the planarization stop layer, via step 216. For example, step 216 may include performing an RIE that is appropriate for SiC, DLC, and/or a-C. FIG. 10 depicts the transducer 250 after step 216 is performed. Thus, planarization stop structure 256" has been formed. The planarization stop structure 256", planarization assist structure 258', and hard mask structure 260' may be considered to form the mask structure.

Figure 11:
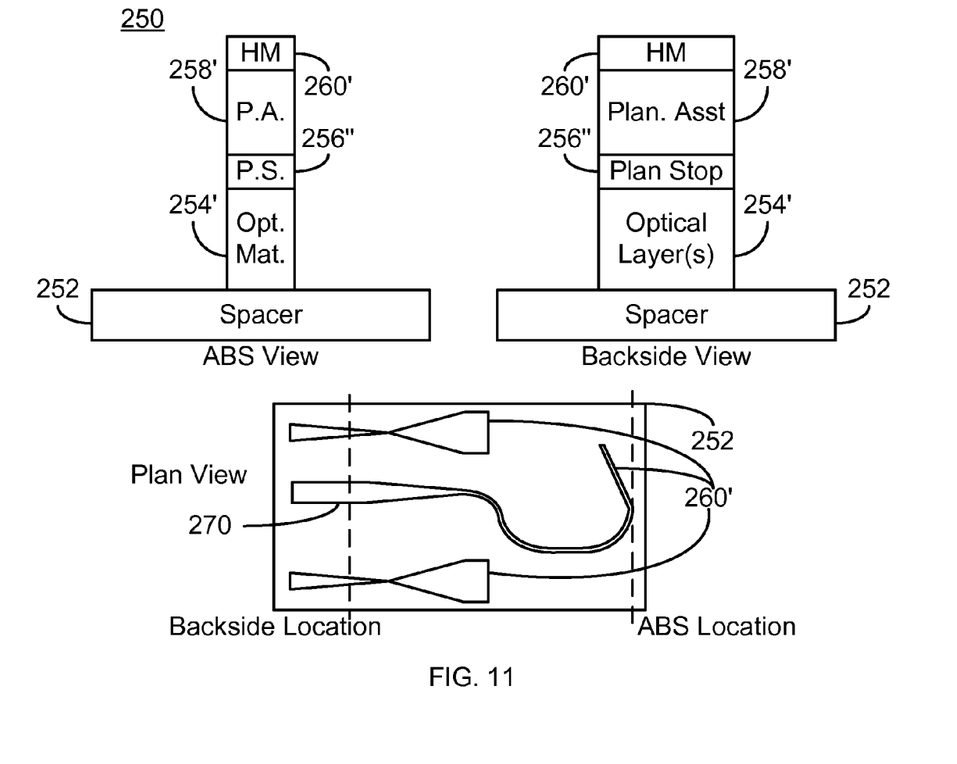

An RIE is performed to transfer the pattern of the mask structure (and thus the photoresist mask 262) to the waveguide core layer, via step 218. Step 218 may include performing a $Ta_2O_5$ RIE. Thus, the core layer of the waveguide structure(s) may be formed. FIG. 11 depicts ABS, backside, and plan views of the transducer 250 after step 218 is performed. Thus, portions 254' of the optical material(s) remain. Further, the waveguide 270 being formed is labeled in the plan view.

Figure 12:
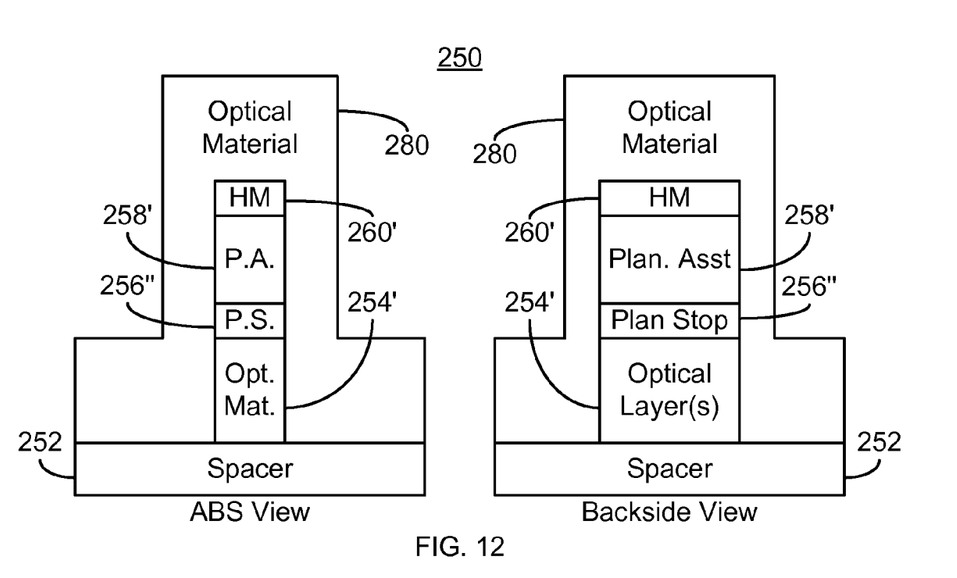

A layer of optical material(s) is provided, via step 220. These optical materials may have a lower index of refraction and may include aluminum oxide and/or silicon dioxide. These material(s) may be used for the cladding. Step 220 may include performing a fast ALD. FIG. 12 depicts the transducer 250 after step 220 is performed. Thus, optical material 280 is shown. Further, the low density of the planarization assist layer 258' is not more than half of the density of the optical material(s) 280. In some embodiments, the low density of the planarization assist layer 258' is not more than one-third of the density of the optical material(s) 280.

Figure 13:
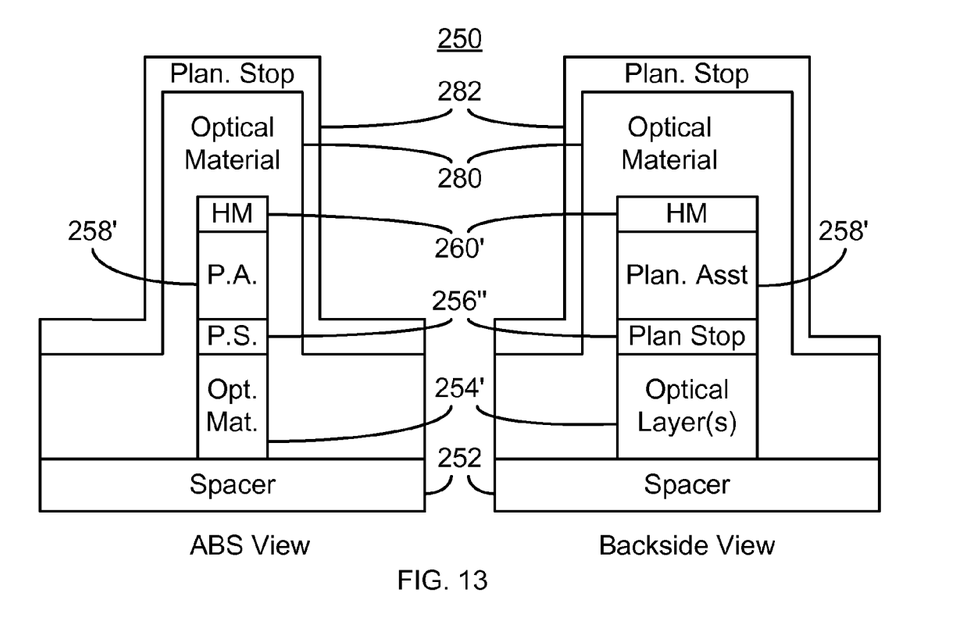

An additional planarization stop layer is deposited on the optical material(s) 280, via step 222. This second planarization stop layer may include one or more of DLC, SiC and a-C. FIG. 13 depicts the transducer 250 after step 222 is performed. Thus, planarization stop layer 282 is shown.

Figure 14:
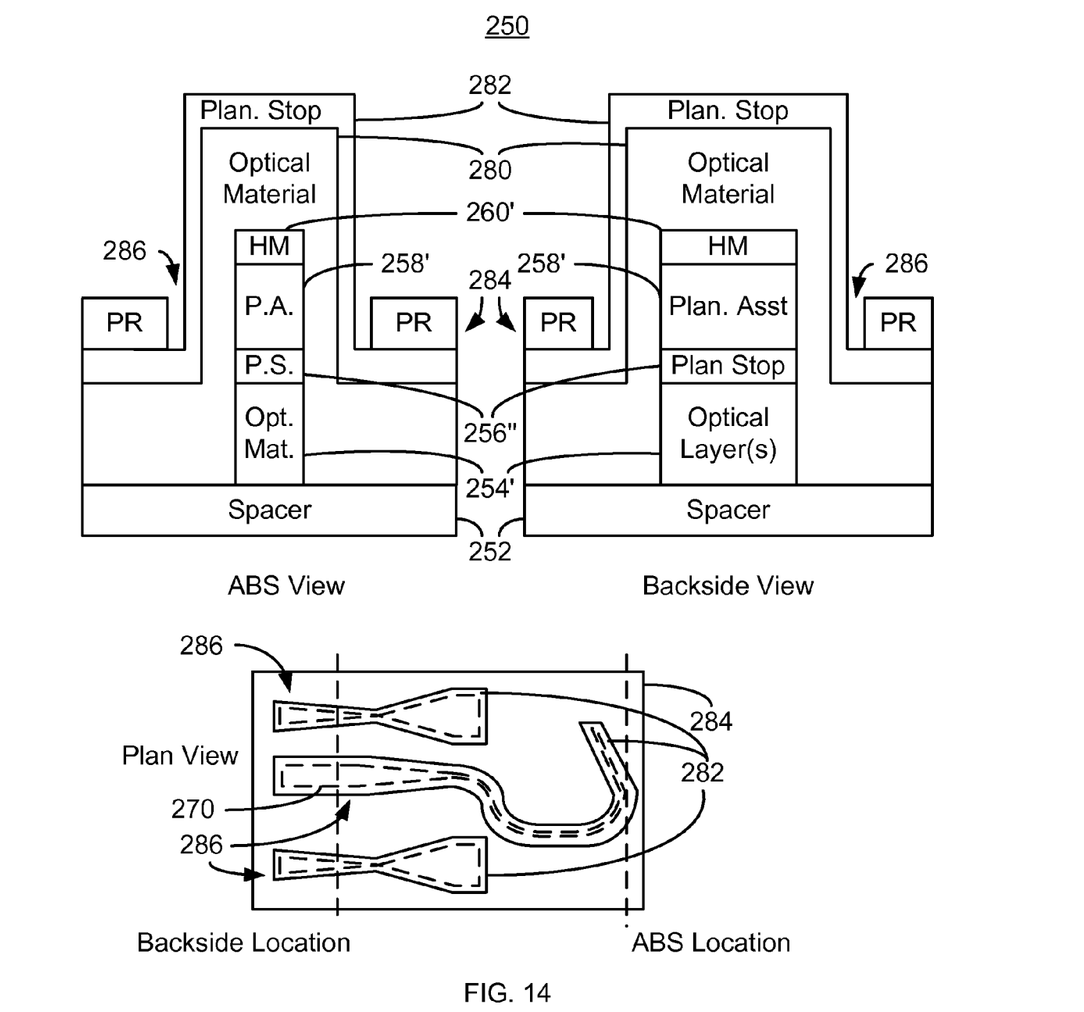

A second photoresist mask having aperture(s) therein is provided, via step 224. The aperture corresponds to the mask structure. Step 224 may be performed by spin coating a layer of photoresist, then using conventional photolithography to form the mask. FIG. 14 depicts the transducer 250 after step 224 is performed. Thus, mask 284 having apertures 286 is formed. As can be seen in FIG. 14, the apertures 286 correspond to the regions in which the mask structures (formed by layers 256", 258', and 260') reside. However, because the mask structures 256", 258', and 260' are covered by optical material(s) 280 and planarization stop layer 282, these structures are denoted by a dashed line.

Figure 15:
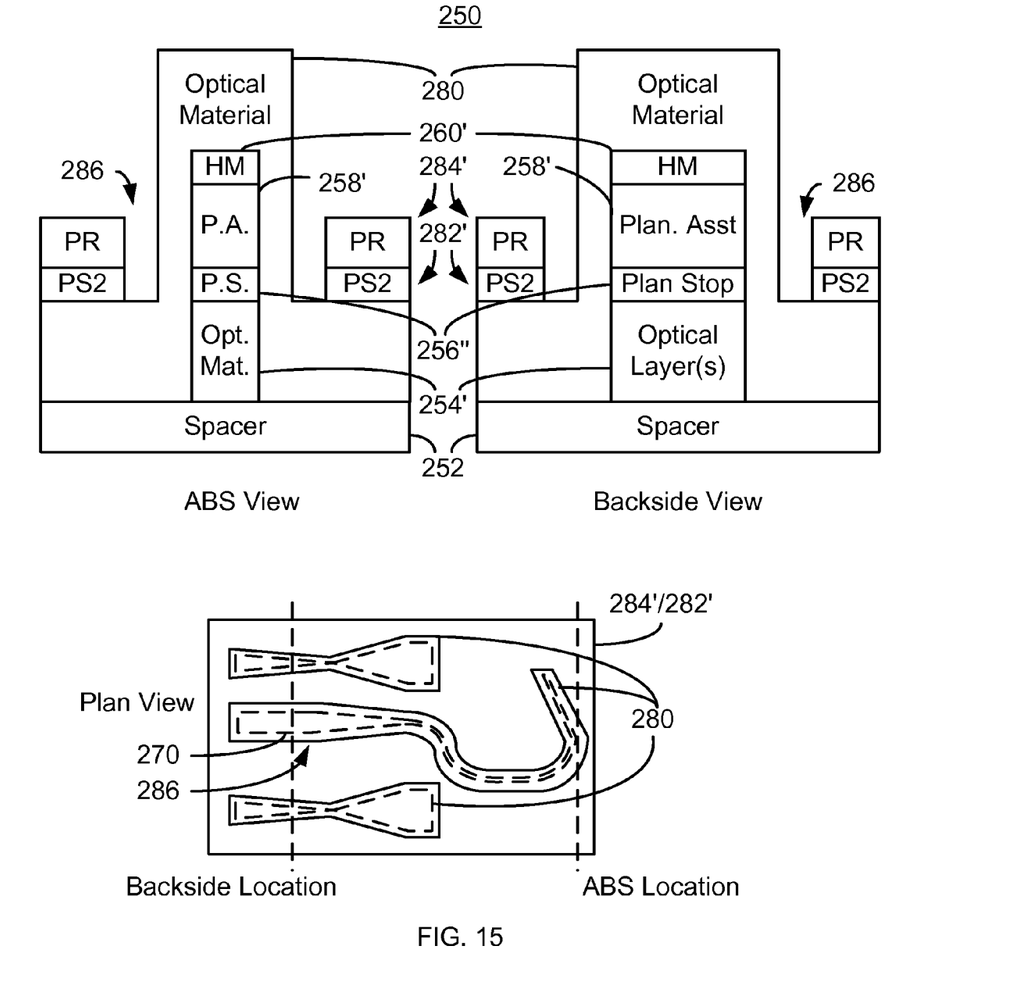
Figure 16:
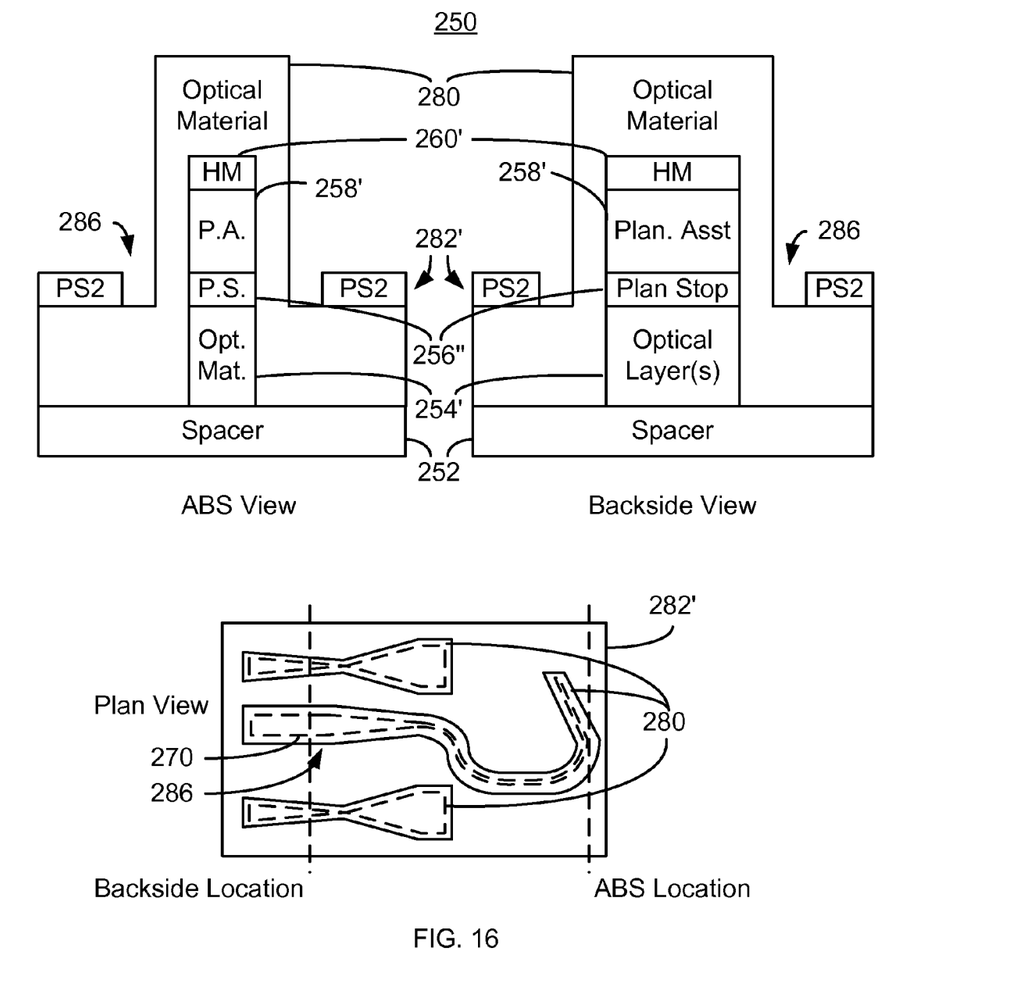

A portion of the second planarization stop layer 282 exposed by the mask 284 is removed, via step 226. An aperture is thus formed in the planarization stop layer. This aperture also corresponds to the mask structure(s) formed of structures 256", 258', and 260'. FIG. 15 depicts the transducer 250 after step 226 is performed. Thus, the aperture 286 is shown in the planarization stop layer 282' In addition, a portion of the photoresist mask 284 may be removed in step 226, leaving mask 284'. The second photoresist mask 284 is also removed, via step 228. Step 228 may be performed using a photoresist strip or analogous process. FIG. 16 depicts ABS, backside, and plan views the transducer 250. The portion of the optical material 280 and underlying structures aligned with the aperture 286' remain exposed. Further, second planarization layer 282' has an aperture 286 therein.

Figure 17:
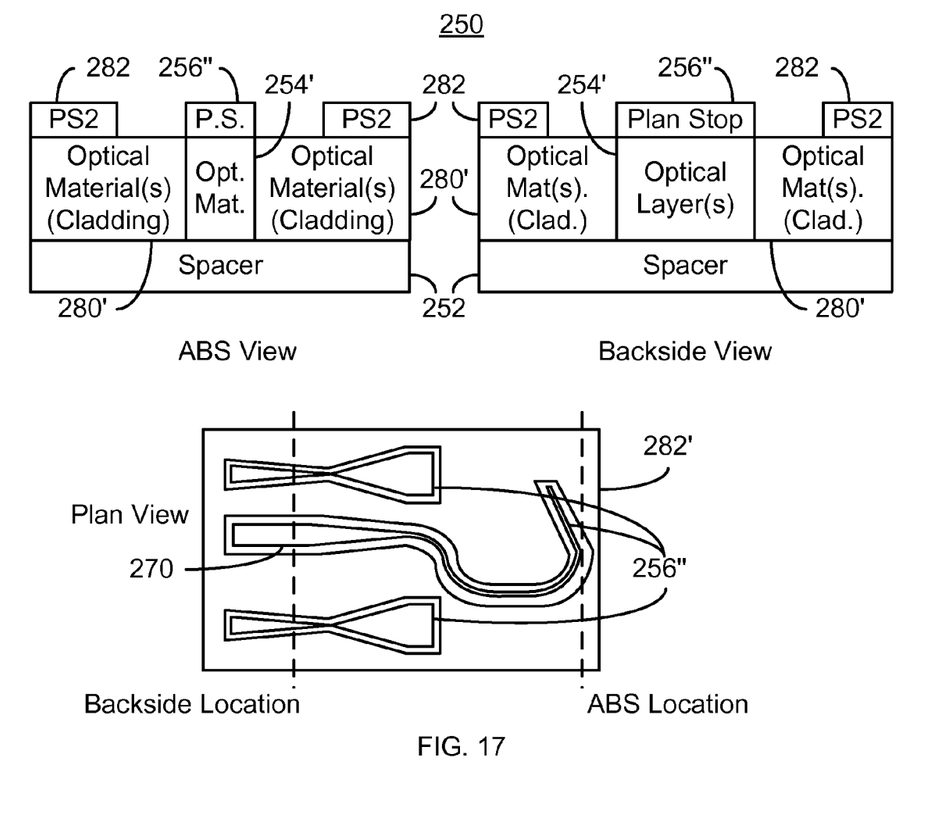

A CMP configured to remove the optical material(s) 280 is performed, via step 230. The CMP removes part of the optical material(s) 280, a remaining portion of the planarization assist structure 258', and a remaining portion of the hard mask structure 260' over all of the structures. At the same time, the waveguide structures are preserved even though the waveguide structures have various of widths. Because the planarization assist layer 258' (not shown in FIG. 17) has a lower density than these optical material(s) 280', the CMP in step 230 tends to crush and/or break up the planarization assist structure 258'. Thus a CMP-assisted lift-off may thus be performed in step 230. In addition, portions of the optical material 280 are removed. FIG. 17 depicts the transducer 250 after step 230 is performed. Thus, planarization stop layer 282 and planarization stop layer 256" are both exposed despite the differing widths of the planarization stop layer 256" at the backside and ABS. Thus, the hard mask structure may be more easily removed using the planarization of step 230.

Figure 18:
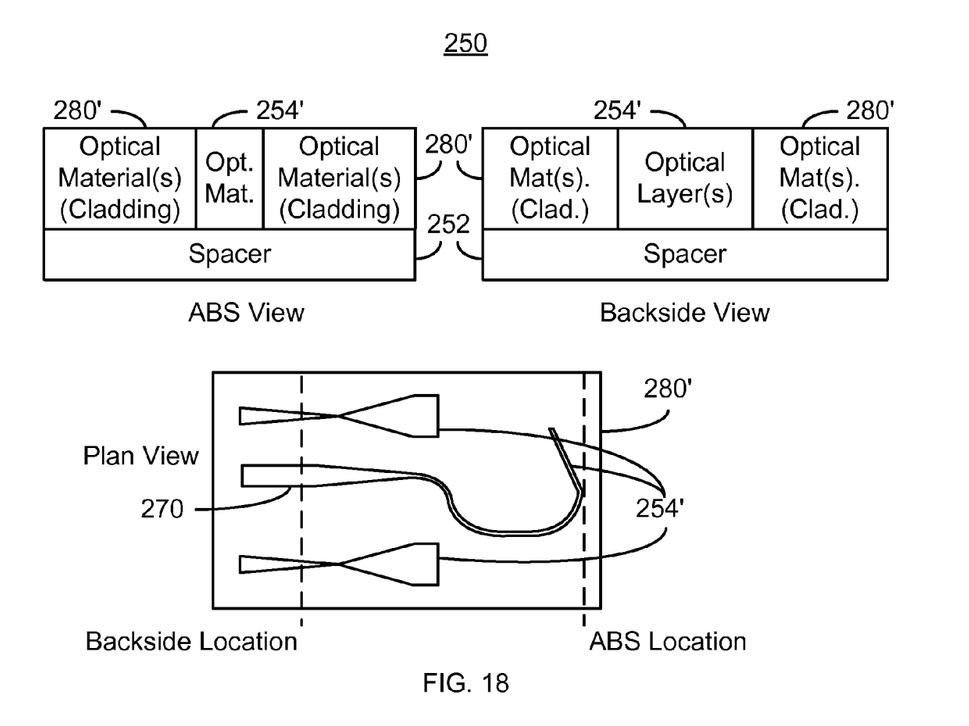

Once the planarization is complete, any remaining portions of the planarization stop layers 256" and 282' may be removed, via step 232. Step 232 may include performing a RIE. Fabrication of the EAMR transducer 250 may then be completed. For example, top cladding and/or other structure may be fabricated. Thus waveguide 270 and test structures are substantially complete. Other components may also be formed. FIG. 18 depicts the transducer 250 after step 232. Thus the optical materials 254' forming the core of the waveguide 270 as well as the cladding 280' are exposed.

Using the method 200, the transducer 250 may be formed. The presence of the planarization assist layer 258' allows portions of the mask structures 256", 258' and 260' used in forming the waveguide structures to be more easily removed. This may be accomplished without overpolishing the narrow portion of the waveguide 270. Consequently, the narrow portion of the waveguide 270, the wider portion of the waveguide 270, and the test structures may all be exposed by the planarization of step 110 without overpolishing/removing the narrow portion of the waveguide 270. Consequently, the waveguide 270 and test structures may function as desired. Thus, fabrication and performance of the transducer 160 may be improved.

We claim:

1. A method for providing a plurality of waveguide structures for an energy assisted magnetic recording (EAMR) transducer, the plurality of waveguide structures having a plurality of widths, the method comprising:
   providing at least one waveguide layer, the at least one waveguide layer including a waveguide core layer;
   providing at least one mask structure having a pattern on the at least one waveguide layer, the at least one mask structure including a planarization stop layer, a planarization assist layer on the planarization stop layer, and a hard mask layer on the planarization assist layer, the planarization assist layer having a low density, the at least one mask structure corresponding to the plurality of waveguide structures;
   transferring the pattern of the at least one mask structure to the at least one waveguide layer, a remaining portion of the at least one waveguide layer forming at least part of the plurality of waveguide structures;
   providing at least one optical material covering the at least one waveguide layer and a remaining portion of the at least one mask structure, the at least one optical material having a density, the low density of the planarization assist layer being not more than half of the density of the at least one optical material; and
   performing a planarization configured to remove at least a portion of the at least one optical material such that the hard mask is removed from the plurality of waveguide structures having the plurality of widths without damaging any of the plurality of waveguide structures.

2. The method of claim 1 wherein the planarization assist layer includes at least one of polydimethylglutarimide and photoresist.

3. The method of claim 1 wherein the low density of the planarization assist layer is not more than one-third of the density of the at least one optical material.

4. The method of claim 1 wherein the at least one optical material includes at least one of aluminum oxide and silicon dioxide.

5. The method of claim 1 wherein the step of providing the at least one mask structure further includes:
   depositing the planarization stop layer;
   depositing the planarization assist layer on the planarization stop layer depositing the hard mask layer on the planarization assist layer;
   providing a photoresist mask having the pattern corresponding to the at least one mask structure; and
   transferring the pattern to the planarization stop layer, the planarization assist layer, and the hard mask layer.

6. The method of claim 5 wherein the step of transferring the pattern further includes:
   transferring the pattern to the hard mask layer;
   performing a first reactive ion etch (RIE) to transfer the pattern to the planarization assist layer; and
   performing a second RIE to transfer the pattern to the planarization stop layer.

7. The method of claim 1 further comprising:
   providing an additional planarization stop layer on the at least one optical material, the additional planarization stop layer having an aperture therein, the aperture corresponding to the at least one mask structure.

8. The method of claim 7 further comprising:
   removing a remaining portion of the planarization stop layer and a remaining portion of the additional planarization stop layer after the step of performing the planarization.

9. The method of claim 1 wherein the step of performing the planarization removes any portion of the at least one optical material, a remaining portion of the planarization assist layer, and a remaining portion of the hard mask layer over all of the plurality of waveguide structures while preserving the plurality of waveguide structures having the plurality of widths.

10. The method of claim 1 wherein the planarization includes a chemical mechanical planarization.

11. The method of claim 1 wherein a portion of the at least one optical material forms a cladding for the waveguide.

12. A method for providing a plurality of waveguide structures for an energy assisted magnetic recording (EAMR) transducer, the plurality of waveguide structures having a plurality of widths, the method comprising:
   providing at least one waveguide layer including a core layer;
   providing a planarization stop layer;
   providing a planarization assist layer on the planarization stop layer, the planarization assist layer including at least one of polydimethylglutarimide and photoresist;
   providing a hard mask layer on the planarization assist layer;
   providing a first photoresist mask on the hard mask layer, the first photoresist mask having a pattern corresponding to the plurality of waveguide structures;
   transferring the pattern to the hard mask layer to form a hard mask structure;
   performing a reactive ion etch (RIE) to transfer the pattern to the planarization assist layer to form a planarization assist structure;

transferring the pattern to the planarization stop layer to form a planarization stop structure, a mask structure being formed by the planarization stop structure, the planarization assist structure, and the hard mask structure;

transferring the pattern of the at least one mask structure to the at least one waveguide layer such that a remaining portion of the at least one waveguide layer forms at least a portion of the plurality of waveguide structures;

providing at least one optical material covering the at least one waveguide layer and a remaining portion of the at least one mask structure;

providing an additional planarization stop layer on the at least one optical material;

providing a second photoresist mask having a first aperture therein, the first aperture corresponding to the mask structure;

removing a portion of the additional planarization stop layer, forming a second aperture therein, the second aperture corresponding to the at least one mask structure;

removing the second photoresist mask;

performing a chemical mechanical planarization (CMP) configured to remove at least a portion of the at least one optical material, the CMP removing any portion of the at least one optical material, a remaining portion of the planarization assist structure, and a remaining portion of the hard mask structure over all of the plurality of waveguide structures while preserving the plurality of waveguide structures having the plurality of widths; and removing a remaining portion of the planarization stop structure and a remaining portion of the additional planarization stop layer.

* * * * *